United States Patent Office 2,952,834
Patented Sept. 13, 1960

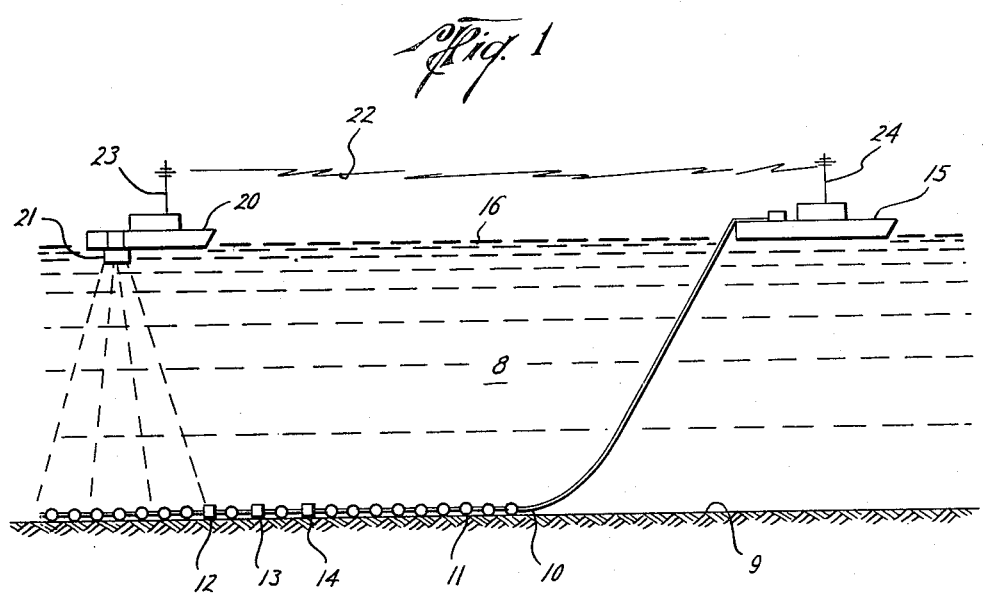
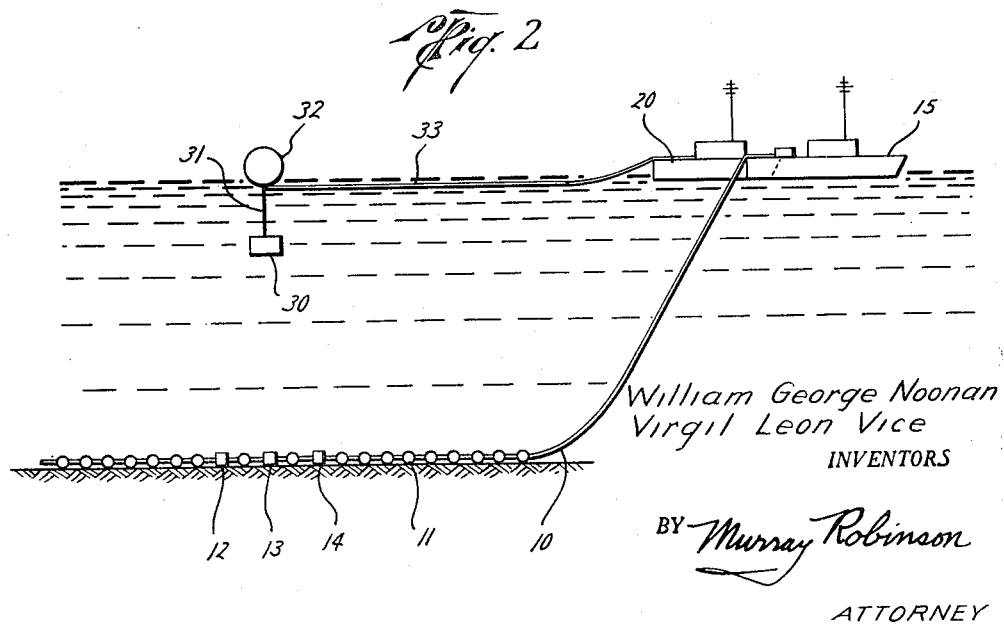
William George Noonan
Virgil Leon Vice
INVENTORS
BY Murray Robinson
ATTORNEY

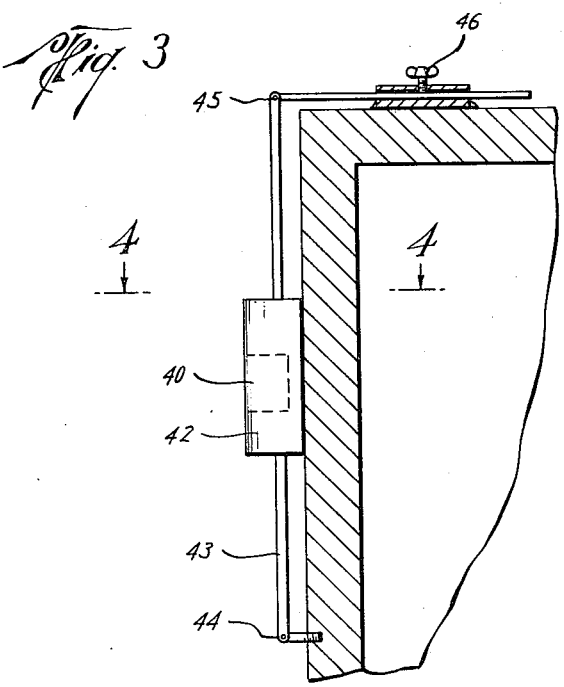
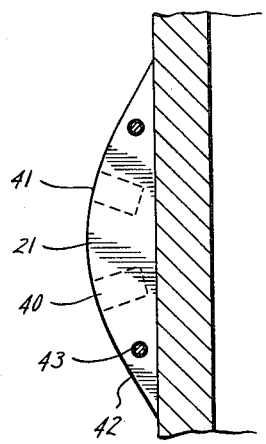
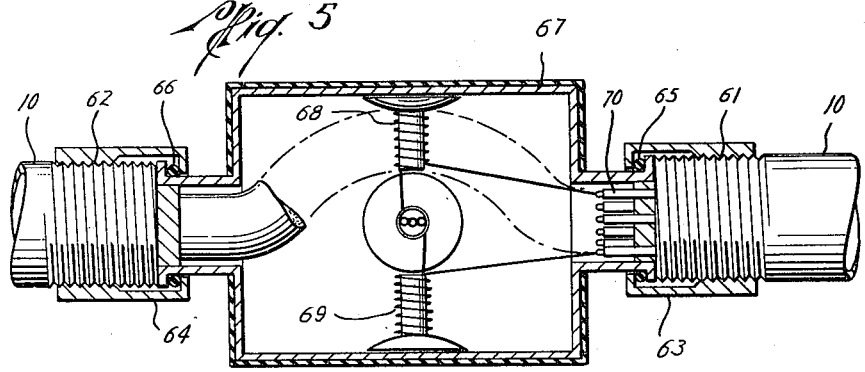
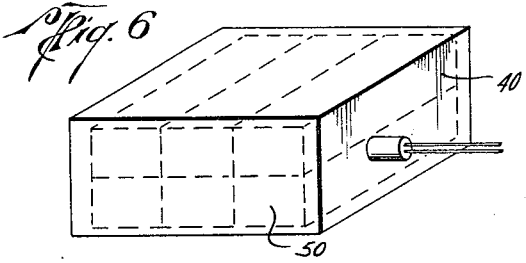
William George Noonan
Virgil Leon Vice
INVENTORS
BY Murray Robinson
ATTORNEY

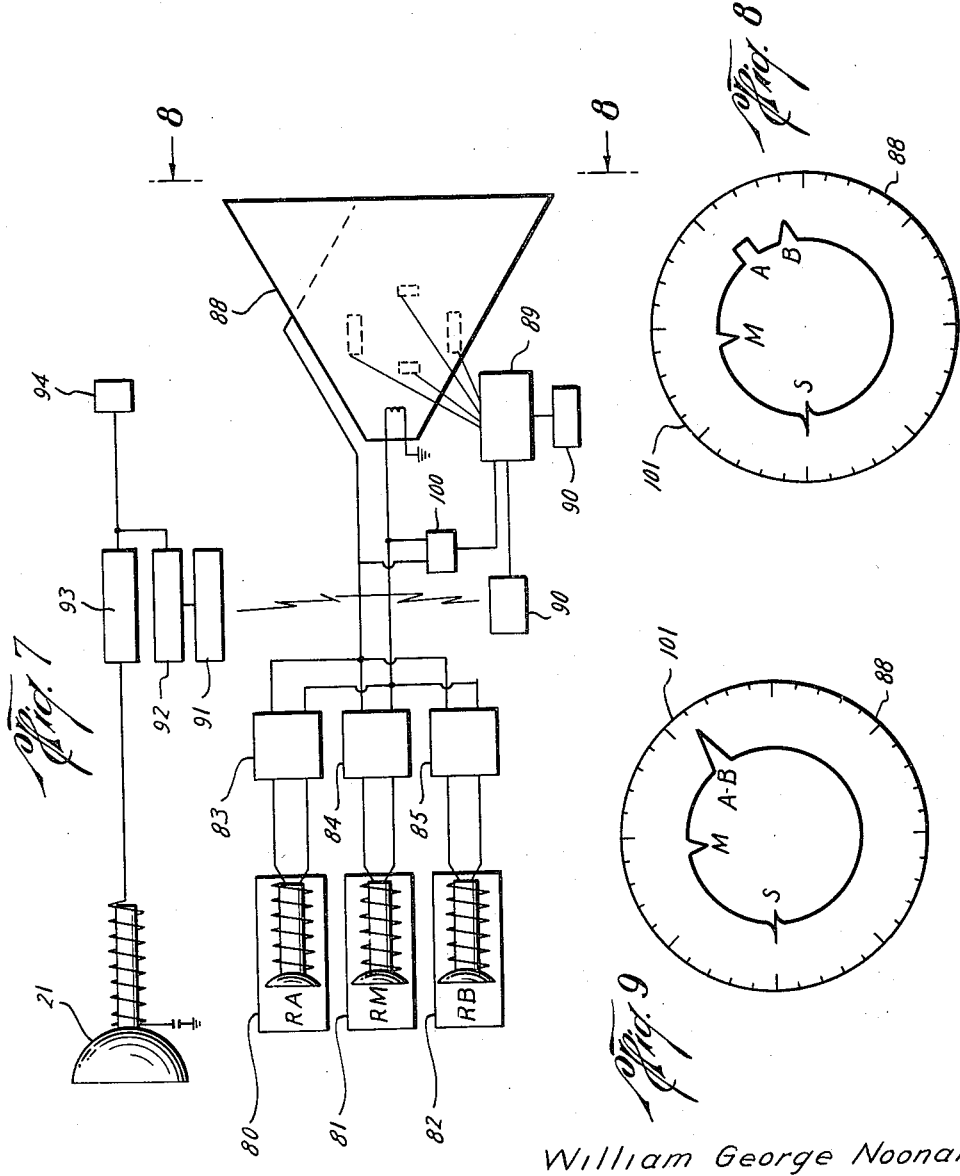

2,952,834

SEISMIC EXPLORATION

William George Noonan and Virgil Leon Vice, Houston, Tex., assignors to Marine Exploration Company, Houston, Tex.

Filed Nov. 28, 1955, Ser. No. 549,354

5 Claims. (Cl. 340—15)

This invention pertains to method and apparatus useful in seismic exploration, and more particularly to such method and apparatus for determining the position of a seismic transmitter such as an explosive to be detonated under water relative to a plurality of seismic receivers or geophones disposed in a seismic marine cable on a marine floor.

An object of the invention is to position the transmitter precisely relative to the receivers in order to eliminate a great deal of extra calculations due to displacements of the transmitter from a central position.

A further object of the invention is to determine accurately the position of the transmitter relative to the receivers.

Further objects are to accomplish the foregoing in a simple, economical, reliable, safe manner.

Other objects and advantages of the invention will appear from the following description of a preferred embodiment of the invention, reference being made to the accompanying drawings wherein:

Figure 1 is a vertical section through the earth and a body of water illustrating the use of the invention;

Figure 2 is a view similar to Figure 1 illustrating a later stage in the method of the invention;

Figure 3 is a vertical section through the side of a boat showing the ultrasonic positioning transmitter in elevation;

Figure 4 is a section taken on line 4—4 of Figure 3;

Figure 5 is an axial section through an ultrasonic positioning receiver in the seismic marine cable;

Figure 6 is a perspective of the interior of the ultrasonic transmitter;

Figure 7 is a schematic diagram of the circuit connecting the ultrasonic positioning receivers with an oscilloscope; and Figures 8 and 9 are views of the face of the oscilloscope in different positions of the ultrasonic positioning transmitter relative to the ultrasonic positioning receivers.

Referring first to Figure 1 there is shown a body of water 8 overlying a marine floor 9 on which lies a seismic marine cable 10 along which are disposed a plurality of spaced apart geophones 11 and three ultrasonic receivers 12, 13, 14, all of which are electrically connected by the cable to apparatus on recording boat 15 on the surface 16 of the water for recording the responses of the geophones to seismic waves and for indicating the responses of the ultrasonic receivers. It is to be noted that the geophones are responsive to seismic vibrations which may be of frequencies between 5 and 500 cycles per second, whereas the ultrasonic receivers are tuned to a particular ultrasonic frequency, preferably 50,000 cycles per second.

Also on the surface of the water is a shoot boat 20 which carries an ultrasonic transmitter 21 disposed underwater on the side of the boat. The ultrasonic transmitter 21 generates waves of the same frequency as that to which the receivers are tuned. The transmitter energy is sent out at regular intervals in short pulses of preferably 1 millisecond duration, preferably at a rate of 8 per second. The transmitter can be keyed either mechanically or electrically, and preferably the pulse frequency is synchronized with radio pulses indicated schematically at 22, received by radio receiver 23 on the shoot boat and emanating from radio transmitter 24 on the recorder boat. The synchronizing radio pulses are synchronized on the recorder boat with the sweep frequency of an oscilloscope used to indicate relative times of reception of ultrasonic waves by receivers 12, 13, and 14.

It is desired to position the shoot boat in a line from the center ultrasonic receiver 13 perpendicular to the line between receivers 12 and 14. When the shoot boat, or more exactly the ultrasonic transmitter 21 carried by the shoot boat, is on the said perpendicular line, the time of reception of ultrasonic pulses therefrom by receivers 12 and 14 will be the same, and the shoot boat is maneuvered until this is the case. Then a seismic transmitter such as explosive charge 30 (see Figure 2) is dropped overboard from the shoot boat in a position on the said perpendicular line.

The charge 30 is suspended under water, preferably about five feet, by a cable 31 from a float 32. The charge is connected by electric cable 33 to shoot boat 20, or other means is provided to set off the seismic transmitter from a remote distance, the shoot boat moving away to a safe distance. When the charge 30 is detonated, seismic waves will be generated which will be received by geophones 11 and recorded on the recorder boat in the usual manner.

Not only does the invention provide for positioning the charge on the desired perpendicular line from the seismic marine cable, but it also gives the offset distance from the charge to the cable, this being measured by the difference in time of reception of the ultrasonic pulses by center receiver 13 and the outer receivers 12 and 14.

Referring now to Figures 3 and 4, there is shown ultrasonic transmitter 21 comprising two directional transmitting units 40, 41 having overlapping beams and mounted in a streamlined housing 42 supported on a swinging frame 43 hinged at 44 and 45 and adjustably anchored at 46. By this means the transmitter can be positioned to direct its beam at the desired angle to the marine floor.

As shown in Figure 6, each unit such as 40 of the ultrasonic transmitter may be of a conventional type including a rubber diaphragm 50 energized by six drivers or solenoids inside (not shown) connected to six adjacent sectors of the diaphragm. These devices, commonly called transducers, are also suitable for the ultrasonic receivers, as shown in Figure 5.

Referring to Figure 5, there is shown a portion of cable 10 having threaded ends 61, 62 to which are screwed flanged unions 63, 64 pressing O ring seals 65, 66 against the flanged ends of receiver housing 67. Within the housing are disposed a plurality of receiver units such as 68, 69 azimuthally spaced around the cable axis so as to be responsive to seismic vibrations in all directions. The coils of the receiver transducer units, as well as those of the geophones, are connected to the cable ends by pin and socket connections such as shown at 70.

Referring now to Figure 7, there is shown schematically the electric circuit of the entire positioning apparatus. Three receiver units 80, 81, 82, from the three ultrasonic receivers 12, 13, 14, are connected by the marine cable through suitable amplifier-shapes 83, 84, 85 to oscilloscope 88 on the recorder boat. Circular sweep potential generator 89 for the oscilloscope is controlled in frequency manually by control means 90. Preferably the generator 89 is also connected to radio transmitter 90 which generates synchronizing pulses for controlling the keying of ultrasonic acoustic transmitter 21 on the shoot boat. The synchronizing pulses are received by radio receiver 91 which controls electric keying means 92 for oscillator 93. If exact synchronism is not required, the radio synchronizing system can be omitted and the oscillator keyed by an independently timed means 94 such as a clockwork driven commutator. It would also be possible to synchronize by generating synchronizing radio signals on the shoot boat timed by the keying means 94, the synchronizing signals being received on the recorder boat to control the oscilloscope sweep frequency. However, radio transmitters are undesirable on the shoot boat because of the danger of detonation of the explosive charge on the shoot boat by the locally generated electromagnetic waves.

Figure 8 shows the face of the oscilloscope 88 when the shoot boat is not on the perpendicular bisector of the line between the outer ultrasonic receivers 12, 14. Pips A and B received by receivers 12 and 14 are spaced apart from each other and from pip M received by receiver 13. The pips are suitably shaped by amplifier-shaper means 83, 84, 85 so as to be distinguishable. Thus, as shown, pip M is directed inward while pips A and B are directed outward and pip A is further differentiated by a square wave shape as distinguished from the triangular or saw tooth shape of pips M and B. The pip pattern of Figure 8 shows that the shoot boat is nearer the receiver 13 than it is to either of receivers 12 or 14, because the pip M is displaced counterclockwise from pips A and B. However, the shoot boat is not exactly on the perpendicular line through receiver 13 because pip A is being received before pip B, indicating that the shoot boat must be moved closer to receiver 14. The shoot boat is maneuvered closer to receiver 14 until pips A and B overlap, as shown in Figure 9. The length of the arc between pip M and superposed pips AB is then a measure of the difference $t$ between the distance of the shoot boat from the outer receivers 12, 14 and its distance X from the center receiver 13. The distance $d$ between the center receiver 13 and each outer receiver is known so that the lateral offset X can be calculated from the right triangle equation $$x^2 + d^2 = (x+t)^2$$

or $$X = \frac{d^2 - t^2}{2t}$$

Preferably, however, a pip S, suitably differentiated in shape from pips M, A, and B, for example a sine wave as shown, is generated on the recorder boat and indicated on the oscilloscope at the instant of transmission of the ultrasonic pulses from the shoot boat, this being accomplished by connecting the sweep frequency generator 89 on the recorder boat with a pip generator 100 connected to the oscilloscope. The arc length between pip S and any of the pips A, B, or M is then a direct measure of the distance of the shoot boat from the corresponding ultrasonic recivers 12, 14, or 13. A suitable scale 101 may be placed on the face of the oscilloscope to allow direct reading of distances. The scale will be calibrated to conform to the assumed speed of travel of the ultrasonic waves in the water by adjusting the sweep frequency of the oscilloscope. With such an arrangement only two ultrasonic receivers are necessary to fix the position of the ultrasonic transmitter completely, since the lateral offset can be calculated from the distances of the ultrasonic transmitter from the two receivers and the distance between the latter.

Some idea of the distances involved may be gained from the knowledge that a seismic marine cable may be several thousand feet long and the geophones thereon may be spaced at intervals of the order of 100 feet. The ultrasonic receivers 12, 13, and 14 may be several hundred feet apart. The seismic transmitter may be located anywhere from immediately over the seismic marine cable to several thousand feet away. If desired, the method and apparatus of the invention can be used to position the seismic transmitter at other points than on the perpendicular bisector of the line between the outer ultrasonic receivers, for knowing the distance from each and the distance between them, the precise position of the shoot boat, ultrasonic transmitter, and seismic transmitter can be precisely calculated at all times.

When it is desired to make a seismogram at a particular location, the recorder boat carries the seismic marine cable to the desired position and then comes to rest. The oscilloscope sweep generator controls the radio transmitter on the recorder boat to send out synchronizing pulses which are received on the shoot boat to key the ultrasonic frequency generator on the shoot boat which energizes the ultrasonic transmitter thereon. The latter is beamed down in the water toward the seismic marine cable where the ultrasonic receivers pick up the pulses and the cable transmits them to the oscilloscope whose indicators tell the operator the location of the shoot boat. The latter is then maneuvered into the desired position, the seismic transmitter is dropped overboard and the shoot boat moved to a safe distance, following which the seismic transmitter is energized and the resulting waves are received by the geophones and transmitted by the seismic marine cable to the recorder boat where their response is recorded.

While a preferred embodiment of the invention has been shown and described, many modifications thereof can be made by one skilled in the art without departing from the spirit of the invention and it is desired to protect by Letters Patent all forms of the invention falling within the scope of the following claims.

We claim:

1. Apparatus for seismic exploration comprising a recorder boat, a seismic marine cable extending from the recorder boat having a plurality of geophones spaced apart therealong, a plurality of ultrasonic receivers spaced apart along the cable, means on the recorder boat for recording seismic signals received by the geophones, means on the recorder boat for indicating the time of reception of ultrasonic pulses by the ultrasonic receivers, a shoot boat, a seismic transmitter to be positioned by the shoot boat, an ultrasonic transmitter carried by the shoot boat, and means for controlling the ultrasonic transmitter to emit energy in pulses at regular intervals.

2. The combination of claim 1 in which the recorder boat carries a radio transmitter and means coupled to the ultrasonic pulse reception indicating means on the recorder boat to control said radio transmitter to emit synchronizing pulses, and the shoot boat carries a radio receiver responsive to said synchronizing pulses and means coupled to said radio receiver to synchronize the means on the shoot boat that controls the ultrasonic transmitter with the synchronizing pulses received by said radio receiver and thus with the ultrasonic pulse reception indicating means on the recorder boat.

3. Method of seismic exploration over water comprising positioning in the desired location on the marine floor a seismic marine cable carrying spaced ultrasonic receivers as well as geophones, generating an ultrasonic pulse on a boat carrying a seismic transmitter, determining the position of the boat relative to the cable from the times of reception of the pulse by the ultrasonic receivers, moving the boat until it is in the desired position relative to the seismic cable, placing the seismic transmitter in the water at said desired position, and recording signals received by the geophones generated by the seismic transmitter.

4. Method of seismic exploration over water comprising positioning in the desired location on the marine floor a seismic marine cable carrying spaced ultrasonic receivers as well as geophones, generating an ultrasonic pulse from means whose position is known, determining the position of said means relative to the cable from the times of reception of the pulse by the ultrasonic receivers, moving said means until it is in the desired position relative to the cable, placing a seismic transmitter at the said position, and recording signals generated by the seismic transmitter received by the geophones.

5. A seismic marine cable comprising a plurality of geophones spaced apart therealong, a plurality of ultrasonic receivers spaced apart along the cable in between the geophones, each ultrasonic receiver comprising a plurality of ultrasonic receiver units uniformly azimuthally spaced around the axis of the cable section directed in different directions from the cable axis, the response angles of said units overlapping to render the receiver responsive to ultrasonic energy in all directions around the cable axis, mechanical means connecting said geophones and receivers in a single line at fixed positions along the line, and electric conductors extending through said mechanical means for connecting the geophones and ultrasonic recivers to apparatus at the end of the cable.

References Cited in the file of this patent

UNITED STATES PATENTS

| | | |
|---|---|---|
| 1,974,422 | Hayes | Sept. 25, 1934 |
| 2,590,530 | Groenendyke | Mar. 25, 1952 |
| 2,622,691 | Ording | Dec. 23, 1952 |
| 2,754,493 | Lippel | July 10, 1956 |